United States Patent
Del Gaizo et al.

(10) Patent No.: US 10,654,531 B2
(45) Date of Patent: May 19, 2020

(54) ACTIVE AND PASSIVE SYSTEMS FOR WHEELHOUSE AIR DEFLECTION

(71) Applicant: GM GLOBAL TECHNOLOGY OPERATIONS LLC, Detroit, MI (US)

(72) Inventors: Steven A. Del Gaizo, Madison Heights, MI (US); William Fang, Bloomfield Hills, MI (US); Joseph M. Polewarczyk, Rochester Hills, MI (US); Jeffrey L. Konchan, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 282 days.

(21) Appl. No.: 15/908,863

(22) Filed: Mar. 1, 2018

(65) Prior Publication Data
US 2019/0270486 A1    Sep. 5, 2019

(51) Int. Cl.
*B62D 35/00* (2006.01)
*B62D 25/16* (2006.01)

(52) U.S. Cl.
CPC .......... *B62D 35/008* (2013.01); *B62D 25/16* (2013.01)

(58) Field of Classification Search
CPC ....... B62D 35/00; B62D 35/008; B62D 25/16
USPC .......................................................... 701/49
See application file for complete search history.

(56) References Cited

U.S. PATENT DOCUMENTS

| | | | |
|---|---|---|---|
| 2004/0155485 A1* | 8/2004 | Hamnett | B62D 35/008 296/180.1 |
| 2013/0096781 A1* | 4/2013 | Reichenbach | B60Q 1/326 701/49 |

* cited by examiner

*Primary Examiner* — Tan Q Nguyen
(74) *Attorney, Agent, or Firm* — Quinn IP Law

(57) ABSTRACT

An exemplary automotive vehicle includes a body having a wheelhouse, the wheelhouse including a wheelhouse edge defining a wheelhouse opening, and a wheel disposed in the wheelhouse opening, a suspension system including a suspension component adjacent to the wheelhouse, the suspension component configured to vertically deflect during vehicle operation, an aerodynamic system including an aerodynamic member disposed within the wheelhouse opening and coupled to the suspension component, the aerodynamic member having a first position with respect to the wheelhouse edge and the wheel and a second position with respect to the wheelhouse edge and the wheel, wherein the aerodynamic member moves from the first position to the second position with deflection of the suspension component such that a distance between the aerodynamic member and the wheel is greater when the aerodynamic member is in the second position than when the aerodynamic member is in the first position.

17 Claims, 4 Drawing Sheets

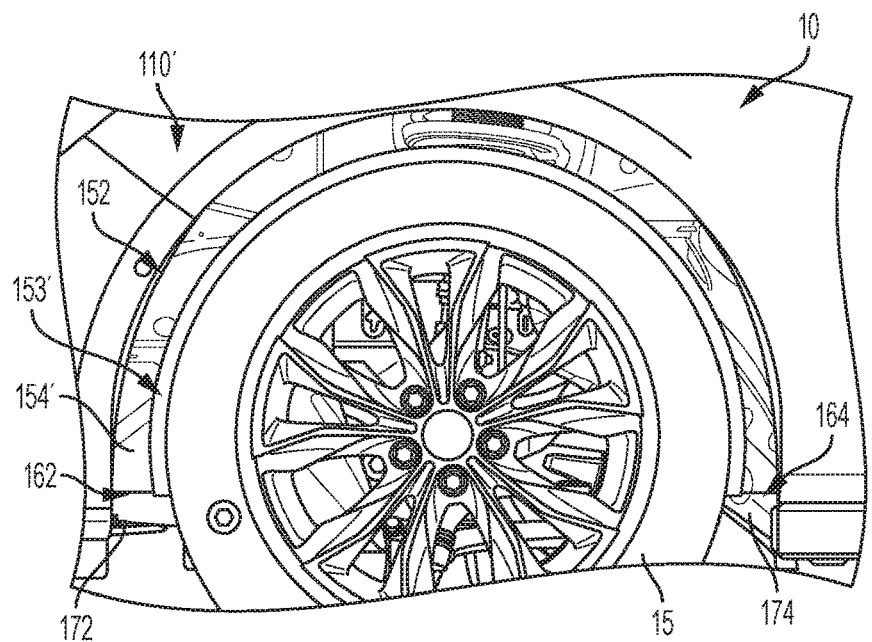
FIG. 6
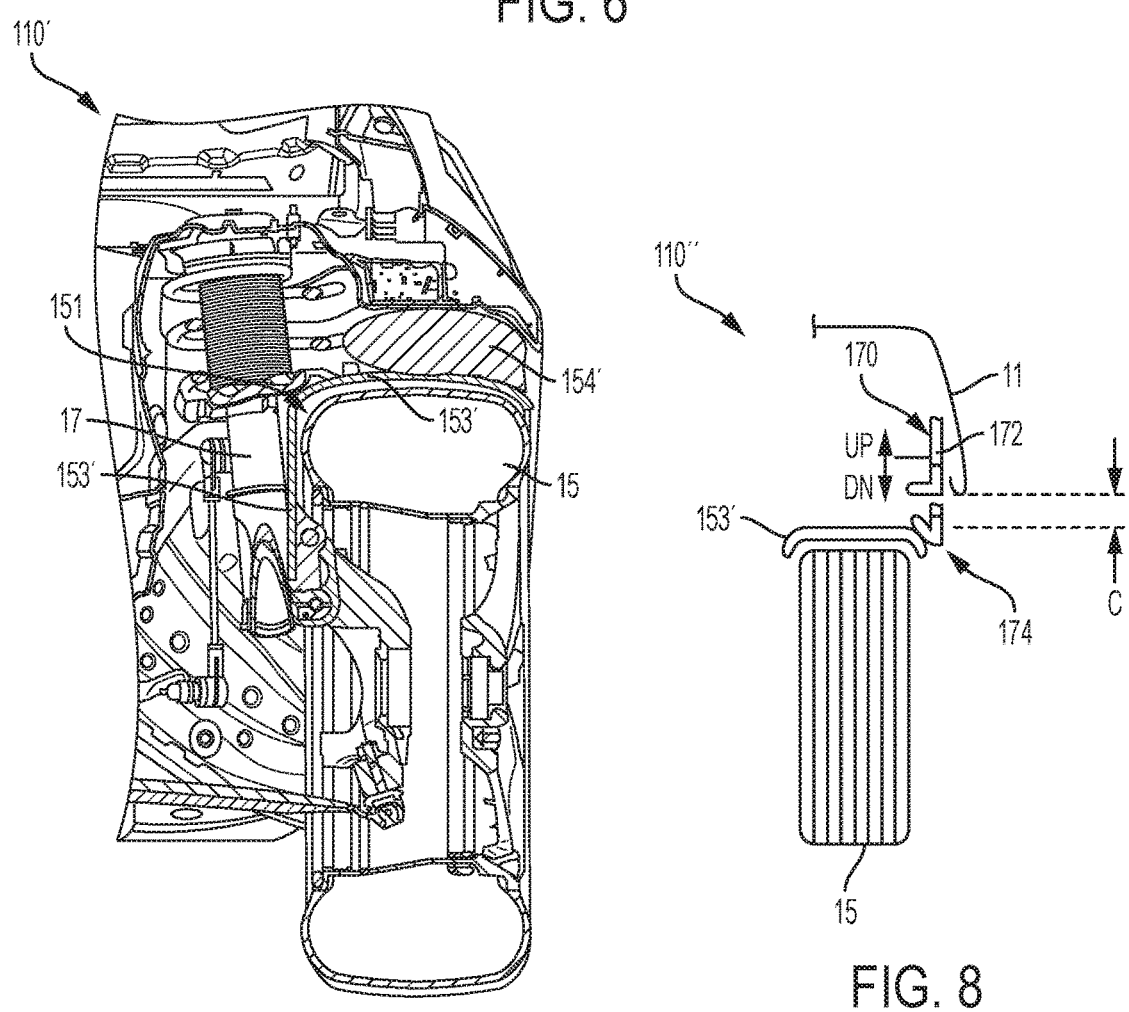
FIG. 7
FIG. 8

ACTIVE AND PASSIVE SYSTEMS FOR WHEELHOUSE AIR DEFLECTION

INTRODUCTION

The present invention relates generally to the field of vehicles and, more specifically, to active and passive wheel liners for reduced aerodynamic drag.

As an automotive vehicle travels, it disturbs the air through which it passes. This air disturbance has an impact on energy consumption of the automotive vehicle, among other factors. Overcoming wind resistance and turbulence generated by the passage of the vehicle expends energy, which must be obtained from fuel, electricity, or other stored energy of the vehicle. The greater the wind resistance and turbulence, the greater the expenditure of fuel and the lower the fuel economy. Vehicles are therefore generally designed with aerodynamic performance in mind. In conventional vehicle design aerodynamic features are generally fixed body structures. However, recently, actively movable aerodynamic features have been implemented on some vehicles. In particular, airflow through the wheelhouse can cause unwanted drag.

SUMMARY

Embodiments according to the present disclosure provide a number of advantages. For example, embodiments according to the present disclosure reduce drag forces on a vehicle by reducing wheel wake separation zones and the inherent drag in the wheel openings.

In one aspect, an automotive vehicle includes a body having a wheelhouse, the wheelhouse including a wheelhouse edge defining a wheelhouse opening, and a wheel disposed in the wheelhouse opening, a suspension system including a suspension component adjacent to the wheelhouse, the suspension component configured to vertically deflect during vehicle operation, an aerodynamic system including an aerodynamic member disposed within the wheelhouse opening and coupled to the suspension component, the aerodynamic member having a first position with respect to the wheelhouse edge and the wheel and a second position with respect to the wheelhouse edge and the wheel. In some aspects, the aerodynamic member moves from the first position to the second position with deflection of the suspension component such that a distance between the aerodynamic member and the wheel is greater when the aerodynamic member is in the second position than when the aerodynamic member is in the first position.

In some aspects, the automotive vehicle further includes at least one vehicle sensor configured to measure a vehicle characteristic and a controller in communication with the at least one vehicle sensor.

In some aspects, the aerodynamic system further includes a close out member movably coupled to the body.

In some aspects, the controller determines at least one vehicle operating condition from the vehicle characteristic and, in response to the at least one vehicle operating condition being satisfied, determines a position of the close out member.

In some aspects, the vehicle characteristic includes one or more of a steering wheel angle, a brake pedal position, a vehicle speed, a wheel displacement, and a suspension displacement.

In some aspects, the close out member includes a compliant member and the close out member is movable from a first position to a second position such that the compliant member contacts the aerodynamic member when the close out member is in the second position.

In some aspects, the aerodynamic member includes a wheel liner.

In some aspects, the aerodynamic system includes a flexible member, the flexible member movably coupled to wheelhouse edge and the wheel liner such that the flexible member temporarily deforms in response to suspension system motion.

In another aspect, an automotive vehicle includes a body having a wheelhouse, at least one vehicle sensor configured to measure a vehicle characteristic, an aerodynamic system including an aerodynamic member movably coupled to the wheelhouse, the aerodynamic member having a first position with respect to the wheelhouse and a second position with respect to the wheelhouse, an actuator coupled to the aerodynamic member and configured to actuate the aerodynamic member between the first position and the second position, and at least one controller in communication with the actuator and the at least one vehicle sensor, the at least one controller being configured to control the actuator to move the aerodynamic member from the first position to the second position. In some aspects, the at least one controller determines at least one vehicle operating condition from the vehicle characteristic and, in response to the at least one vehicle operating condition being satisfied, determines a position of the aerodynamic member.

In some aspects, the vehicle characteristic includes one or more of a steering wheel angle, a brake pedal position, a vehicle speed, a wheel displacement, and a suspension displacement.

In some aspects, the aerodynamic member includes an inflatable member.

In some aspects, the aerodynamic member includes a wheel liner.

In yet another aspect, a method of controlling an automotive vehicle includes the steps of providing a first component, providing a second component, the second component being movably coupled to the first component, providing an actuator coupled to the second component and configured to actuate the second component between a first position and a second position, providing a vehicle sensor configured to measure a vehicle characteristic, providing at least one controller in communication with the actuator and the vehicle sensor, and determining at least one vehicle operating condition from the vehicle characteristic and, in response to the at least one vehicle operating condition being satisfied, determining a position of the second component and controlling the actuator to move the second component from the first position to the second position.

In some aspects, the first component is a vehicle body and the second component is an aerodynamic member.

In some aspects, the aerodynamic member includes a wheel liner.

In some aspects, the aerodynamic member further includes an inflatable member such that inflation of the inflatable member acts on the wheel liner to move the wheel liner from a first position to a second position.

In some aspects, the vehicle characteristic includes one or more of a steering wheel angle, a brake pedal position, a vehicle speed, a wheel displacement, and a suspension displacement.

BRIEF DESCRIPTION OF THE DRAWINGS

The present disclosure will be described in conjunction with the following figures, wherein like numerals denote like elements.

FIG. 6 is a schematic side view illustration of a wheelhouse of a vehicle, according to another embodiment of the present disclosure.

FIG. 7 is a schematic cutaway front view illustration of the wheelhouse shown in FIG. 6.

FIG. 8 is a schematic cutaway front view illustration of a wheelhouse of a vehicle, according to another embodiment of the present disclosure.

Figure 1:
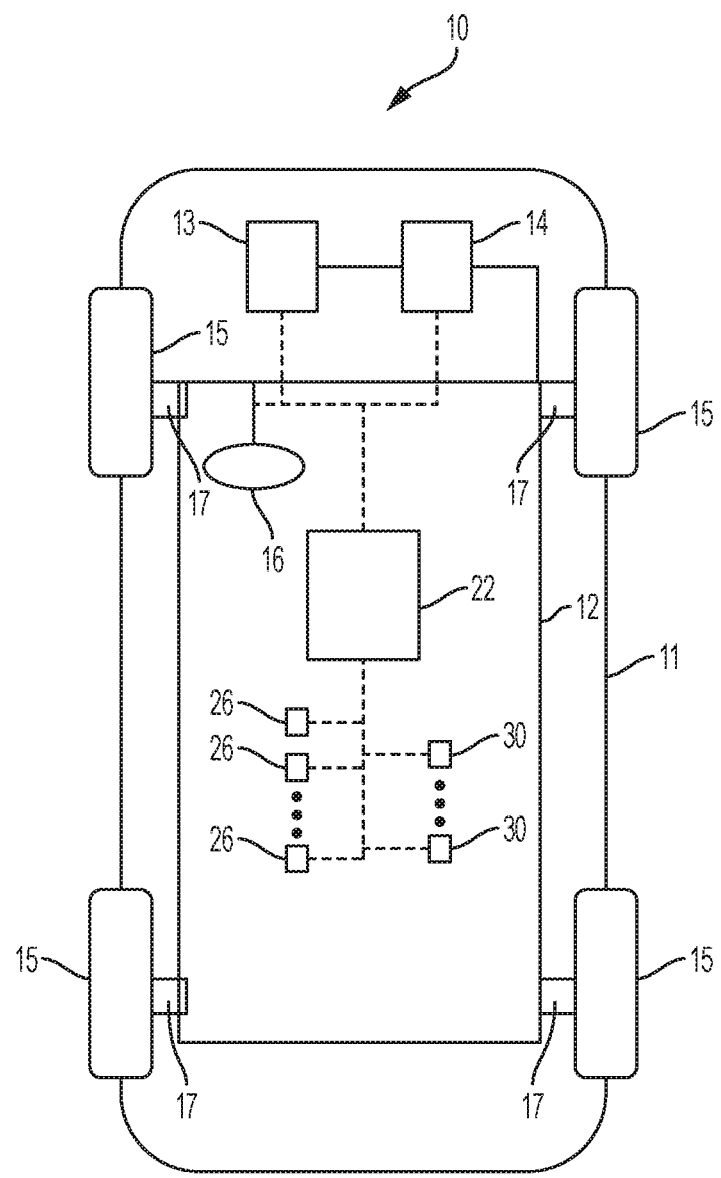
FIG. 1 is a schematic illustration of a vehicle according to an embodiment of the present disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. Throughout the various figures, like reference numbers refer to like components.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first" "second," "third," and so on may be used to describe separate components. Such terminology may include the words specifically mentioned above, derivatives thereof, and words of similar import.

The wheelhouse or wheel opening of a vehicle is a source of potential drag forces on the vehicle due to wheel wake separation. Reducing the open space between the vehicle wheel and the wheelhouse edge can reduce the air flows within the wheelhouse that contribute to vehicle drag. Embodiments discussed herein include passive and active aerodynamic systems to reduce the open space between the wheel and the wheelhouse edge to reduce the drag forces on the vehicle.

FIG. 1 schematically illustrates an automotive vehicle 10 according to the present disclosure. The vehicle 10 generally includes a body 11 and wheels or tires 15. The body 11 encloses the other components of the vehicle 10. The vehicle 10 also generally includes a chassis 12. The body 11 is coupled to the chassis 12. The wheels 15 are each rotationally coupled to the body 11 near a respective corner of the body 11. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. The vehicle 10 additionally includes a steering system 16. While depicted as including a steering wheel and steering column for illustrative purposes, in some embodiments, the steering system 16 may not include a steering wheel. The vehicle 10 additionally includes one or more suspension system components 17 positioned, in some embodiments, adjacent to the plurality of vehicle wheels 15. In some embodiments, as shown in FIG. 1, a suspension system component 17 is positioned adjacent to each of the wheels 15.

With further reference to FIG. 1, the vehicle 10 also includes a plurality of sensors 26 configured to measure and capture data on one or more vehicle characteristics, including but not limited to vehicle speed, tire pressure and/or acceleration (including vertical acceleration), wheel and/or suspension displacement, and vehicle acceleration. In the illustrated embodiment, the sensors 26 include, but are not limited to, an accelerometer, a speed sensor, a tire pressure/acceleration monitoring sensor, a displacement sensor (such as, for example and without limitation, a lower control arm displacement sensor), an acceleration sensor (such as, for example and without limitation, a lower control arm acceleration sensor and/or an upper mount acceleration sensor), gyroscope, steering angle sensor, or other sensors that sense observable conditions of the vehicle or the environment surrounding the vehicle and may include RADAR, LIDAR, optical cameras, thermal cameras, ultrasonic sensors, infrared sensors, light level detection sensors, and/or additional sensors as appropriate. In some embodiments, the vehicle 10 also includes a plurality of actuators 30 configured to receive control commands to control steering, shifting, throttle, braking or other aspects of the vehicle 10.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

Figure 2:
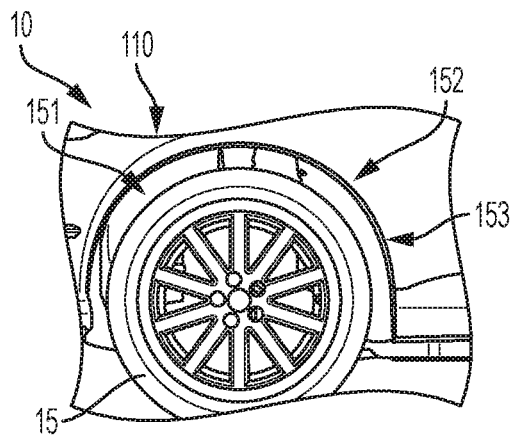
FIG. 2 is a schematic side view illustration of a wheelhouse of a vehicle, according to an embodiment of the present disclosure.

With reference to FIG. 2, in some embodiments, an active aerodynamic system 110 of the vehicle 10 includes an actuator to adjust a radial position of an aerodynamic member such as a wheel liner or fender to increase or decrease the wheel opening. The aerodynamic system 110 includes a wheel opening 151 defined by a wheelhouse edge 152 in the body 11. The wheel 15 is generally disposed within the wheel opening 151. In some embodiments, the active aerodynamic system 110 includes a wheel liner 153. In some embodiments, the wheel liner 153 is a radially movable aerodynamic member adjacent to the wheelhouse edge 152 and the wheel liner 153 moves relative to the wheelhouse edge 152 within the wheel opening 151. In some embodiments, the wheel liner 153 is formed from a flexible, semi-rigid material, such as plastic or rubber.

Figure 3:
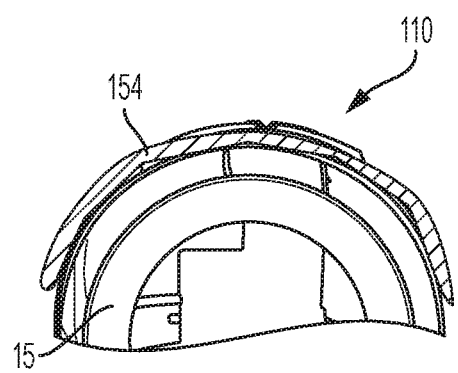
FIG. 3 is schematic cutaway side view illustration of a wheelhouse of a vehicle, according to an embodiment of the present disclosure.
Figure 4:
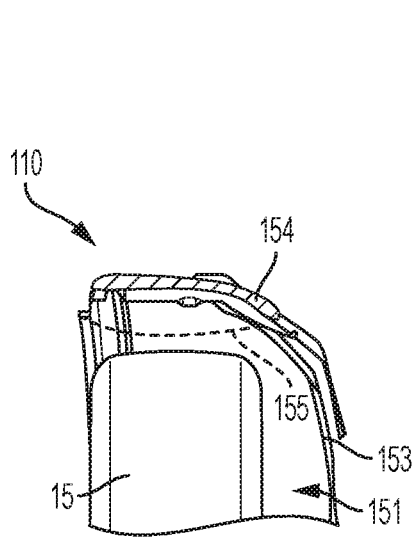
FIG. 4 is a schematic cutaway front view illustration of a wheelhouse of a vehicle, according to an embodiment of the present disclosure.

With reference to FIGS. 3 and 4, in some embodiments the aerodynamic system 110 includes an inflatable member 154. The inflatable member 154 can be any flexible member configured to radially expand within the wheel opening 151, such as a bladder. In some embodiments, the inflatable member 154 is formed from a flexible material such as rubber or elastic. As shown in FIG. 4, the inflatable member 154 can expand from a first, or uninflated, position, to a second, or inflated, position, as indicated by dashed line 155. In some embodiments, the inflatable member 154 is preferably disposed between the wheelhouse edge 152 and the wheel liner 153. As the inflatable member 154 radially expands from the first position to the second position, the inflatable member 154 acts on the wheel liner 153, moving the wheel liner 153 radially inward from a first, or undeployed, position, to a second, or deployed, position toward the wheel 15 within the wheel opening 151. The radially inward movement of the wheel liner 153 reduces the size of the wheel opening 151, that is, when the inflatable member 154 is in the second position, the wheel liner 153 is closer to the wheel 15 than when the inflatable member 154 is in the first position. In some embodiments, the aerodynamic system 110 does not include a wheel liner 153 and expansion of the inflatable member 154 from the first position to the second position reduces the size of the wheel opening 151 to reduce inherent drag and wheel wake separation zones in the wheelhouse.

In some embodiments, an actuator, such as one of the actuators 30, acts on the inflatable member 154 to transition (that is, inflate and/or deflate) the inflatable member 154 from the first position to the second position and vice versa. In some embodiments, an actuator, such as one of the actuators 30, acts directly on the wheel liner 153 to move the wheel liner 153 from the first, or undeployed, position (wherein the wheel liner 153 is adjacent to the wheelhouse edge 152) to the second, or deployed, position (wherein a distance between the wheel liner 153 and the wheelhouse edge 152 is larger than when the wheel liner 153 is in the first position).

Figure 5:
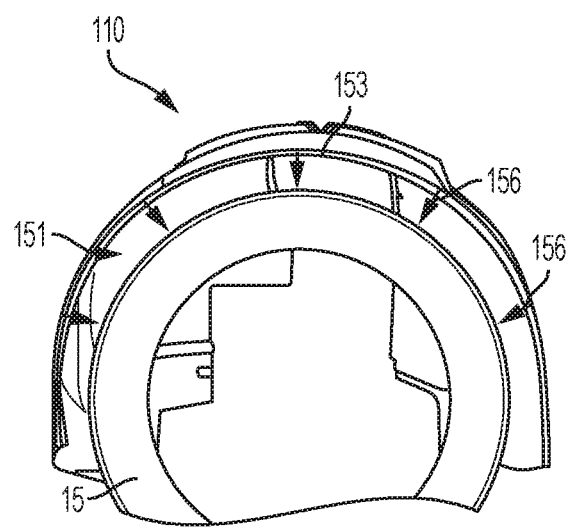
FIG. 5 is another schematic cutaway side view illustration of a wheelhouse of a vehicle, according to an embodiment of the present disclosure.

In some embodiments, as shown in FIG. 5, the aerodynamic system 110 includes a wheel liner 153 formed from a shape-memory alloy ("SMA"). As is known to those skilled in the art, components formed from SMAs "remember" their original shapes and one or more mechanical properties of the components, such as shape, stiffness, or position, change in response to temperature, electromagnetic field changes, or the application of an electric current. In one embodiment, applying a current or an electromagnetic field to the SMA-formed wheel liner 153 causes the wheel liner 153 to deform radially from a first position adjacent to the wheelhouse edge 152, as illustrated by arrows 156, to a second position. As the wheel liner 153 deforms and transitions to the second position radially closer to the wheel 15, the wheel opening 151 is reduced. When the current or electromagnetic field is no longer applied, the wheel liner 153 returns to the first position adjacent to the wheelhouse edge 152.

Active aerodynamic systems, such as the systems 110 illustrated in FIGS. 2-5, are preferably configured such that movement of the wheel liner 153 and/or movement of the inflatable member 154 to reduce the size of the wheel opening 151 does not interfere with unimpeded rotation of the wheel 15 while the vehicle 10 is operating at highway speed with relatively little wheel jounce (that is, excessive relative movement between the body and the road wheels) or flop, when steering inputs to the vehicle are minimal, and when the vehicle brakes are not applied, for example and without limitation.

In some embodiments, a passive aerodynamic system includes a device that fills the wheelhouse or wheel opening with a collapsible air blocker that passively adapts to the changing wheel opening as the vehicle suspension articulates. In some embodiments, the device includes a wheel liner or fender coupled to the vehicle suspension system and a collapsible inflatable member or bladder mounted to either the wheel liner, the wheelhouse edge, or both. Movement of the vehicle suspension system passively adjusts a position of the wheel liner relative to the wheel by compressing the inflatable member in response to suspension system articulation.

With reference to FIGS. 6 and 7, the aerodynamic system 110' includes a wheel opening 151 defined by a wheelhouse edge 152 in the body 11. The wheel 15 is generally disposed within the wheel opening 151. In some embodiments, the aerodynamic system 110' includes a wheel liner 153'. In some embodiments, the wheel liner 153' is a radially movable member that moves relative to the wheelhouse edge 152 within the wheel opening 151. In some embodiments, the wheel liner 153' is coupled to a suspension system component, such as the suspension system component 17. In some embodiments, the wheel liner 153' is a suspension-mounted fender. In some embodiments, the suspension system component 17 is a suspension knuckle. As the suspension system component 17 moves in response to movement of the wheel 15 across an uneven surface, such as a bump, hole, curb, etc., the wheel liner 153' also moves radially to maintain a position within a spacing distance to the wheel 15 and such that the wheel liner 153' does not impact the wheel 15. The spacing distance is calculated, in some embodiments, by determining the wheel flop with consideration to the size and type of wheel, the size of the wheelhouse, the vehicle type and configuration, for example and without limitation. In some embodiments, the wheel liner 153' is formed from a stiff, durable material, such as plastic.

In some embodiments, the aerodynamic system 110' includes an inflatable member 154'. The inflatable member 154' can be any flexible member configured to radially expand within the wheel opening 151, such as a bladder. In some embodiments, the inflatable member 154' is formed from a flexible material such as rubber or elastic. In some embodiments, the inflatable member 154' fills the space in the wheel opening 151 between the wheel liner 153' and the wheelhouse edge 152. The inflatable member 154' is preferably in a first, or inflated, position and can compress to a second, or compressed, position in response to radially outward movement of the wheel liner 153 due to suspension system articulation. The wheel liner 153' provides a non-rotating surface upon which the inflatable member 154' can rest, with the wheel liner 153' positioned as close to the wheel 15 as possible without impeding rotation of the tire.

The inflatable member 154' fills the radial space surrounding the wheel 15 and, in some embodiments, extends from a first, or forward, wheelhouse edge 162 to a second, or rearward, wheelhouse edge 164. In some embodiments, the inflatable member 154' is made of a flexible material. In some embodiments, the inflatable member 154' is a foam member molded to fit within the wheel opening 151 and encased within an outer covering or "skin" of a durable, flexible material. In some embodiments, the inflatable member 154' is mounted to both the body structure (such as the wheelhouse edge 152 of the body 11) and the wheel liner 153' such that the inflatable member 154' can stretch, flex, collapse, or otherwise temporarily deform in response to jounce, rebound, and/or steering motions of the vehicle suspension system. With reference to FIG. 6, in some embodiments, each of a forward edge 172 and a rearward edge 174 of the inflatable member 154' terminates at a lower edge of the body 11 of the vehicle 10 to preserve vehicle styling and performance targets.

In some embodiments, the inflatable member 154' is pressurized, such as by ram air or other pressurization means. In some embodiments, the inflatable member 154' is configured to retract or compress when the vehicle 10 is operating at low speed.

The spring rate of the inflatable member 154' is used to determine a target stiffness or stiffness range of the wheel liner 153' such that the wheel liner 153' reacts to forces applied by inflatable member 154' and the suspension system without contacting the wheel 15 while under load. Additionally, the spring rate of the inflatable member 154' is considered when determining the spring/shock rates for the vehicle suspension system.

Referring to FIG. 8, in some embodiments, an aerodynamic system 110" includes a close out member 170. In some embodiments, the close out member 170 includes an extension member 172 having a first end coupled to a component of the vehicle 10 and a second end. A compliant member 174 is coupled to the second end of the extension member 172. In some embodiments, the extension member 172 is coupled to the vehicle chassis 12 or the vehicle body 11.

The close out member 170 is configured to vertically articulate, that is, move vertically up and down, in relation to the wheel 15. The close out member 170 moves from a first, or stowed, position to a second, or deployed, position and vice versa in response to vehicle dynamics data. In some embodiments, the close out member 170 is configured to be actuated from the first position to the second position in response to a vehicle speed value and/or a steering wheel angle gradient value. In some embodiments, the close out member 170 is electromechanically actuated, such as by one of the actuators 30. In some embodiments, the close out member 170 is actuated by a bladder or other inflatable member. In some embodiments, the close out member 170 is spring-loaded. In other embodiments, the close out member 170 is actuated from the first position to the second position and vice versa by any mechanical or electromechanical means.

The close out member 170 extends from a position above an exterior or outward-facing edge of the wheel liner 153'. The compliant member 174 is a flexible member that "closes out" the at least a portion of the side of the wheelhouse of the vehicle 10. In some embodiments, the compliant member 174 is a seal, flap, or brush member that contacts the wheel liner 153' to block air intrusion along the side of the wheelhouse. The compliant member 174 closes the gap between the vehicle body 11 and the wheel liner 153' while adjusting to small steering inputs and wheel jounce.

In some embodiments, as best shown in FIG. 8, a clearance C separates the wheel liner 153, 153' and the vehicle body 11. The clearance C allows the wheel 15 to turn in response to a steering command at full suspension travel such that the wheel liner 153' does not impact the vehicle body 11. In some embodiments, the close out member 170 extends from the stowed position to the deployed position to close out the gap between the wheel liner 153' and the body 11 defined by the clearance C.

In each of the embodiments discussed herein, calculation of the wheel envelope includes the position of the wheel liner 153, 153' and the wheelhouse edge 152 to prevent impact between the wheel 15 and the wheel liner 153, 153' during vehicle operation. Preferably, the wheel liner 153, 153' is positioned relative to the wheel 15 such that tire flop clearances are satisfied. Tire flop clearances depend on the vehicle type, suspension, wheel, and other factors.

Figure 9:
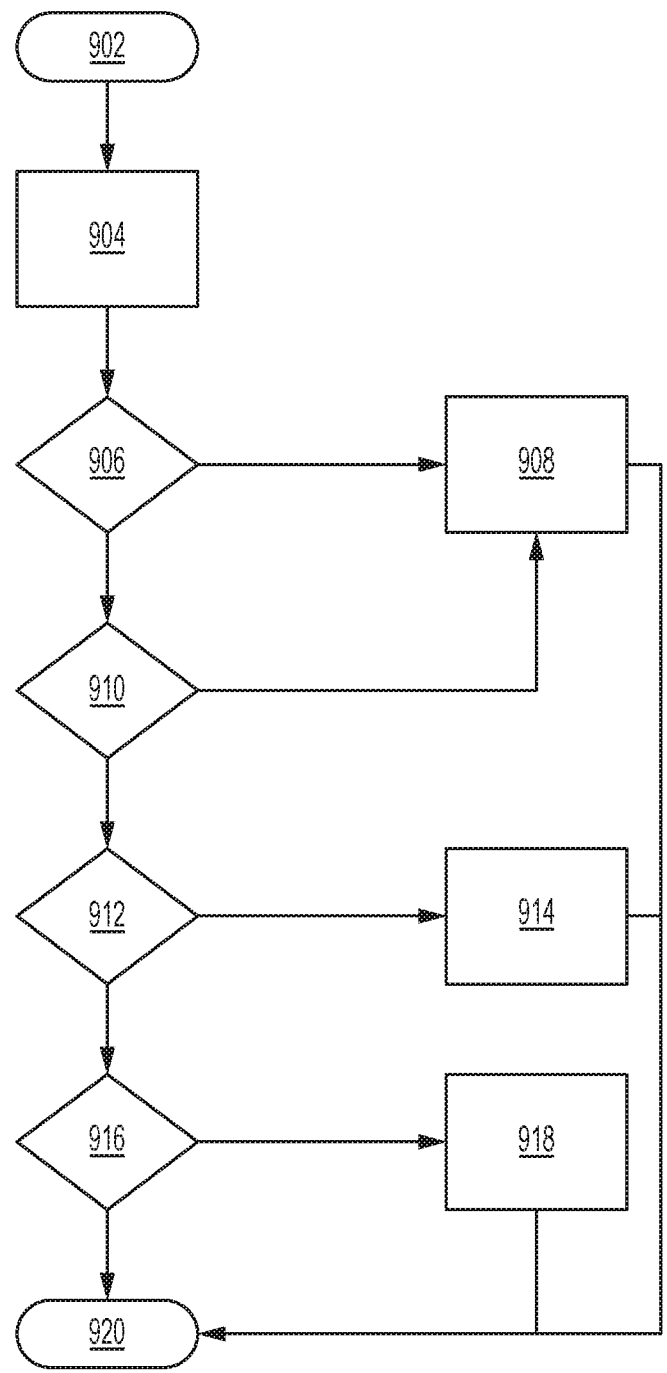
FIG. 9 is a flowchart of a method for controlling an aerodynamic system, according to an embodiment of the present disclosure.

In some embodiments, the aerodynamic system, such as the aerodynamic system 110, 110', 110" is actuated based on data received from one or more vehicle sensors 26 regarding a vehicle characteristic or operating condition. Referring now to FIG. 9, a method 900 of controlling an aerodynamic system according to the present disclosure is illustrated in flowchart form. In some embodiments, a controller, such as the controller 22, receives one or more vehicle dynamics inputs indicating a vehicle characteristic or operating condition and from this input information, determines whether to deploy or adjust a position of an aerodynamic member. The method 900 may be used with a vehicle, such as the vehicle 10, having a controller 22, one or more sensors 26, one or more actuators 30, and an aerodynamic system, such as the aerodynamic system 110, 110', 110".

Starting at 902, the method 900 proceeds to 904. At 904, the controller 22 receives data from one or more vehicle sensors 26 indicating one or more vehicle characteristics or operating conditions. The data representing the vehicle characteristic or operating condition includes, for example and without limitation, data indicating a vehicle speed, a vehicle acceleration, a steering wheel angle, a steering wheel angle gradient, a brake position, a throttle position, a wheel displacement, or a suspension displacement.

From 904, the method 900 proceeds to 906. At 906, the controller 22 determines whether the data received from the one or more sensors 26 indicates that the vehicle 10 is in a steering condition. The data indicating that the vehicle 10 is in a steering condition includes, for example and without limitation, data indicating a steering wheel angle and/or a steering wheel angle gradient. In some embodiments, at 906, the controller 22 compares steering data received from the one or more vehicle sensors 26 with a steering threshold, which is, in some embodiments, a steering wheel angle threshold. In some non-limiting embodiments, the steering threshold is a steering wheel angle of approximately 10 degrees. If the steering data is above the steering threshold, the controller 22 will not deploy the aerodynamic member, such as the wheel liner 153, 153' and/or the close out member 170.

If the determination made at 906 is positive, that is, that the steering data indicates that the vehicle 10 is turning and/or the steering data is above the steering threshold, the method 900 proceeds to 908. At 908, the controller 22 does not deploy the aerodynamic member. From 908, the method 900 proceeds to 920 and ends.

If the determination made at 906 is negative, that is, that the steering data does not indicate that the vehicle 10 is turning and/or the steering data is not above the steering threshold, the method 900 proceeds to 910. At 910, the controller 22 determines whether the data received from the one or more sensors 26 indicates that the vehicle 10 is in a braking condition. The data indicating that the vehicle 10 is in a braking condition includes, for example and without limitation, braking data indicating that the vehicle brake is applied and/or a brake pedal position. In some embodiments, at 910, the controller 22 compares braking data received from the one or more vehicle sensors 26 with a brake pedal position threshold. In some embodiments, the brake pedal position threshold indicates the maximum amount of brake pedal travel allowed before the controller determines the vehicle is braking. In some embodiments, if the braking data is above the brake pedal position threshold, the controller 22 will not deploy the aerodynamic member, such as the wheel liner 153, 153' and/or the close out member 170.

If the determination made at 910 is positive, that is, that the braking data indicates that the vehicle 10 is braking and/or the braking data is above the brake pedal position threshold, the method 900 proceeds to 908. At 908, the controller 22 does not deploy the aerodynamic member. From 908, the method 900 proceeds to 920 and ends.

If the determination made at 910 is negative, that is, that the braking data does not indicate that the vehicle 10 is braking and/or the braking data is not above the brake pedal position threshold, the method 900 proceeds to 912. At 912, the controller 22 determines whether the data received from the one or more sensors 26 indicates jounce or other suspension displacement. In some embodiments, the displacement data indicating suspension displacement includes, for example and without limitation, wheel displacement data and/or suspension displacement data. In some embodiments, at 912, the controller 22 compares displacement data received from the one or more vehicle sensors 26 with a displacement threshold. In some embodiments, the displacement threshold is a maximum value of wheel and/or suspension displacement above which deployment of the aerodynamic member might impede the wheel 15. In some embodiments, if the displacement data is above the displacement threshold, the controller 22 will not deploy the aerodynamic member, such as the wheel liner 153, 153' and/or the close out member 170, or will adjust a position of the aerodynamic member to avoid contact between the aerodynamic member and the wheel 15.

If the determination made at 912 is positive, that is, that the displacement data indicates jounce or other suspension displacement, the method 900 proceeds to 914. At 914, the controller 22 does not deploy the aerodynamic member or adjust a position of the aerodynamic member. From 914, the method 900 proceeds to 920 and ends.

If the determination made at 912 is negative, that is, that the displacement data does not indicate jounce or other suspension or wheel displacement activity, the method 900 proceeds to 916. At 916, the controller 22 determines whether the data received from the one or more sensors 26 indicates that the vehicle speed is above a speed threshold or within a speed range. The speed threshold or range indicates a minimum speed or preferred vehicle speed range. Operation of the vehicle 10 above the minimum speed or within the preferred vehicle speed range indicates high confidence that the vehicle will experience minimal steering inputs and/or jounce or other displacement events. In some embodiments, the minimum speed is a highway cruise speed. In some embodiments, the vehicle speed range is a range of vehicle speed approximately centered around the highway cruise speed.

If the determination made at 916 is positive, that is, that the vehicle speed data indicates that the vehicle is operating at or above the minimum speed target or within the preferred vehicle speed range, the method 900 proceeds to 918. At 918, the controller 22 deploys the aerodynamic member, that is, generates a control signal that is transmitted to one or more of the actuators 30 to actuate the aerodynamic member from the first position to the second position. In some embodiments, at 918, the controller 22 adjusts a position of the aerodynamic member. The method 900 then proceeds to 920 and ends.

If the determination made at 916 is negative, that is, that the vehicle speed data indicates that the vehicle is operating below the minimum speed target or not within the preferred vehicle speed range, the aerodynamic member is not deployed or adjusted and the method 900 proceeds to 920 and ends.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 0.5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle, comprising:
    a body having a wheelhouse, the wheelhouse comprising a wheelhouse edge defining a wheelhouse opening, and a wheel disposed in the wheelhouse opening;
    a suspension system comprising a suspension component adjacent to the wheelhouse, the suspension component configured to vertically deflect during vehicle operation;
    an aerodynamic system comprising an aerodynamic member disposed within the wheelhouse opening and coupled to the suspension component, the aerodynamic member having a first position with respect to the wheelhouse edge and the wheel and a second position with respect to the wheelhouse edge and the wheel;
    wherein the aerodynamic member moves from the first position to the second position with deflection of the suspension component such that a distance between the aerodynamic member and the wheel is greater when the aerodynamic member is in the second position than when the aerodynamic member is in the first position.

2. The automotive vehicle of claim 1 further comprising at least one vehicle sensor configured to measure a vehicle characteristic and a controller in communication with the at least one vehicle sensor.

3. The automotive vehicle of claim 2 wherein the aerodynamic system further comprises a close out member movably coupled to the body.

4. The automotive vehicle of claim 3, wherein the controller determines at least one vehicle operating condition from the vehicle characteristic and, in response to the at least one vehicle operating condition being satisfied, determines a position of the close out member.

5. The automotive vehicle of claim 4, wherein the vehicle characteristic includes one or more of a steering wheel angle, a brake pedal position, a vehicle speed, a wheel displacement, and a suspension displacement.

6. The automotive vehicle of claim 5, wherein the close out member comprises a compliant member and the close out member is movable from a first position to a second position such that the compliant member contacts the aerodynamic member when the close out member is in the second position.

7. The automotive vehicle of claim 1, wherein the aerodynamic member comprises a wheel liner.

8. The automotive vehicle of claim 7, wherein the aerodynamic system comprises a flexible member, the flexible member movably coupled to wheelhouse edge and the wheel liner such that the flexible member temporarily deforms in response to suspension system motion.

9. An automotive vehicle, comprising:
a body having a wheelhouse;
at least one vehicle sensor configured to measure a vehicle characteristic;
an aerodynamic system comprising an aerodynamic member movably coupled to the wheelhouse, the aerodynamic member having a first position with respect to the wheelhouse and a second position with respect to the wheelhouse;
an actuator coupled to the aerodynamic member and configured to actuate the aerodynamic member between the first position and the second position; and
at least one controller in communication with the actuator and the at least one vehicle sensor, the at least one controller being configured to control the actuator to move the aerodynamic member from the first position to the second position;
wherein the at least one controller determines at least one vehicle operating condition from the vehicle characteristic and, in response to the at least one vehicle operating condition being satisfied, determines a position of the aerodynamic member.

10. The automotive vehicle of claim 9, wherein the vehicle characteristic includes one or more of a steering wheel angle, a brake pedal position, a vehicle speed, a wheel displacement, and a suspension displacement.

11. The automotive vehicle of claim 9, wherein the aerodynamic member comprises an inflatable member.

12. The automotive vehicle of claim 9, wherein the aerodynamic member comprises a wheel liner.

13. A method of controlling an automotive vehicle, comprising:
providing a first component;
providing a second component, the second component being movably coupled to the first component;
providing an actuator coupled to the second component and configured to actuate the second component between a first position and a second position;
providing a vehicle sensor configured to measure a vehicle characteristic;
providing at least one controller in communication with the actuator and the vehicle sensor; and
determining at least one vehicle operating condition from the vehicle characteristic and, in response to the at least one vehicle operating condition being satisfied, determining a position of the second component and controlling the actuator to move the second component from the first position to the second position.

14. The method of claim 13, wherein the first component is a vehicle body and the second component is an aerodynamic member.

15. The method of claim 14, wherein the aerodynamic member comprises a wheel liner.

16. The method of claim 15, wherein the aerodynamic member further comprises an inflatable member such that inflation of the inflatable member acts on the wheel liner to move the wheel liner from a first position to a second position.

17. The method of claim 13, wherein the vehicle characteristic includes one or more of a steering wheel angle, a brake pedal position, a vehicle speed, a wheel displacement, and a suspension displacement.

* * * * *